United States Patent

Rantanen et al.

[11] Patent Number: 5,162,131
[45] Date of Patent: Nov. 10, 1992

[54] METHOD AND EQUIPMENT FOR MEASUREMENT AND REGULATION OF QUANTITY OF COATING

[75] Inventors: Rauno Rantanen, Muurame; Juha Mykkänen; Markku Lummila, both of Jyväskylä, all of Finland

[73] Assignee: Valmet Paper Machinery Inc., Finland

[21] Appl. No.: 615,418

[22] Filed: Nov. 19, 1990

[30] Foreign Application Priority Data

Jun. 12, 1990 [FI] Finland .................................. 902930

[51] Int. Cl.$^5$ .......................... B05D 3/06; B05D 1/28; B05C 11/00
[52] U.S. Cl. ...................................... 427/10; 427/566; 427/65; 427/428; 118/665; 118/677; 118/679; 118/691; 118/712
[58] Field of Search ...................... 427/8, 9, 10, 36, 65, 427/428; 118/665, 677, 679, 688, 691, 712

[56] References Cited

U.S. PATENT DOCUMENTS

| | | | |
|---|---|---|---|
| 4,047,029 | 9/1977 | Allport | 378/53 |
| 4,135,006 | 1/1979 | Readal et al. | 427/9 |
| 4,251,566 | 2/1981 | Gingerich | 427/428 |
| 4,372,672 | 2/1983 | Pries | 427/10 |
| 4,460,274 | 7/1984 | Schumann et al. | 356/318 |
| 4,696,023 | 9/1987 | Kuusi | 378/46 |
| 4,814,198 | 3/1989 | Baecklund | 427/9 |
| 4,841,156 | 6/1989 | May et al. | 356/381 |
| 4,937,093 | 6/1990 | Chino et al. | 427/10 |
| 4,981,726 | 1/1991 | Rantanen et al. | 427/356 |

Primary Examiner—Marianne Padgett
Attorney, Agent, or Firm—Steinberg & Raskin

[57] ABSTRACT

A method is provided for measuring and regulating the quantity of coating in surface sizing or pigmenting of paper or board, wherein the coating agent is spread by means of a coating device in the form of a film onto the face of a roll in a size press. The film is transferred from the roll face onto the paper or board in the size press nip. A fluorescent marker agent is mixed into the roll coating or into the coating agent and the measurement of the coating quantity is carried out by means of X-ray fluorescence technique from the face of the size press roll before the film of coating agent is transferred onto the web. The roll face or coating agent present in the roll face is irradiated with X-ray radiation to fluoresce the marker agent, and the fluoresced radiation emitted by the marker agent contaianed in the roll coating and attenuated by the coating agent, or the fluoresced radiation emitted by the marker contained in the coating agent is measured and converted to a value of thickness of the coating quantity. The invention further concerns an arrangement for carrying out this method.

16 Claims, 2 Drawing Sheets

METHOD AND EQUIPMENT FOR MEASUREMENT AND REGULATION OF QUANTITY OF COATING

BACKGROUND OF THE INVENTION

Attempts are being made at present in the manufacture of paper to produce paper of ever higher quality. The demand for high quality paper has increased considerably in recent times. Among other things, good printing properties are required from paper so that the importance of coating and surface sizing of paper has increased remarkably.

In the production of paper of higher quality, it is necessary to have ever more accurate information with respect to the various parts of the manufacture so that necessary adjustments can always be carried out when any disturbance in the paper quality occurs. In the case of surface sizing and coating of paper, such information is needed, for example, with respect to the thickness of the coating or the size layer at a stage as early as possible in order to permit immediate reaction to disturbances which are occurring.

Since, in the coating of paper, additives are frequently used for the purpose of improving the properties of paper, which additives contain, for example, titanium dioxide or calcium carbonate, which are fluorescent substances, the measurement of coating quantity based on X-ray fluorescence has proved to be effective. In the prior art, the measurements have, however, been carried out directly from the paper to which the coating agents have already been added, or on paper which has already been surface-sized. One arrangement of this type is described in Finnish Pat. No. 70,750. However, due to the fact that the measurement is carried out directly from the coated paper, the method involves a number of interfering factors, as a consequence of which a sufficiently accurate measurement of coating quantity cannot be achieved. Still further, since the measurement takes place directly from the paper, it is not possible to react sufficiently quickly to effect necessary corrections.

SUMMARY OF THE INVENTION

It is accordingly a primary object of the present invention to provide a method and equipment, wherein the measurement of the coating quantity can be more accurately and more reliably effected than in the prior art.

It is another object of the present invention to provide a method and equipment which makes it possible to react to any disturbance occurring directly in the coating so that necessary adjustments can be carried out immediately upon the occurrence of such disturbance.

The present invention is mainly concerned with a method for measurement and regulation of the quantity of coating in surface sizing or pigmenting of paper or board wherein the coating is spread by means of a coating device as a film onto the face of the roll in the size press, from which face the film is transferred onto the paper or board web in the size press.

The invention is further concerned with equipment for carrying out the method for measurement and regulation of the quantity of coating in surface sizing or pigmenting of paper or board wherein the coating agent is arranged so as to be spread by means for the coating device as a film onto the face of the roll in the size press, the film being arranged to be transferred from the roll face onto the paper or board web in the size press nip.

With the above and other objects in view, the method of the invention is mainly characterized in that a fluorescent marker agent is mixed into the roll coating and the measurement of the coating quantity is carried out by X-ray fluorescence technique from the face of the size press before the film of coating agent is transferred onto the web, so that the roll face is irradiated with X-ray radiation to fluoresce the marker agent and the fluoresced radiation emitted by the marker contained in the roll coating and attenuated by the coating agent is measured and converted to a value of thickness of the coating quantity.

In accordance with a further embodiment of the present invention, the fluorescent marker agent is added to the coating agent, and the measurement of the coating quantity is carried out utilizing the X-ray fluorescence technique from the face of the size press roll before the film of coating agent is transferred onto the web so that the film of coating agent present on the roll face is irradiated with X-ray radiation to fluoresce the fluorescent marker agent contained in the coating agent, and the fluoresced radiation emitted by the marker agent is measured and converted to a value of the thickness of the coating quantity.

The equipment for carrying out the method of the present invention is mainly characterized in equipment which comprises a measurement device arranged at the proximity of the roll face before the size press nip, the measurement head of the device containing a source of radiation that emits X-ray radiation to the roll face, a proportional calculator that receives and measures the radiation emitted from the roll face or from the film of coating agent present on the roll face, or a corresponding device that detects the intensity and/or spectrum of the radiation, and a programmable regulation unit which controls the measurement head of the measurement device and which is arranged to receive the measurement signals from the measurement head and to convert the signals to values of thickness of the film present on the roll face.

The most significant advantages of the present invention over the prior art solutions for such measurements are that according to the invention the measurement is carried out from the face of the size press roll as a measurement of the thickness of the web film before the film is transferred onto the paper web. This permits necessary corrections very quickly so that, in the event of any disturbance, the amount of paper of inferior quality is maintained at a minimum. Moreover, since the measurement is carried out from the roll face, the measurement does not involve disturbance factors corresponding to those occurring on measurements taking place directly from paper.

DETAILED DESCRIPTION OF THE DRAWINGS

Figure 1:
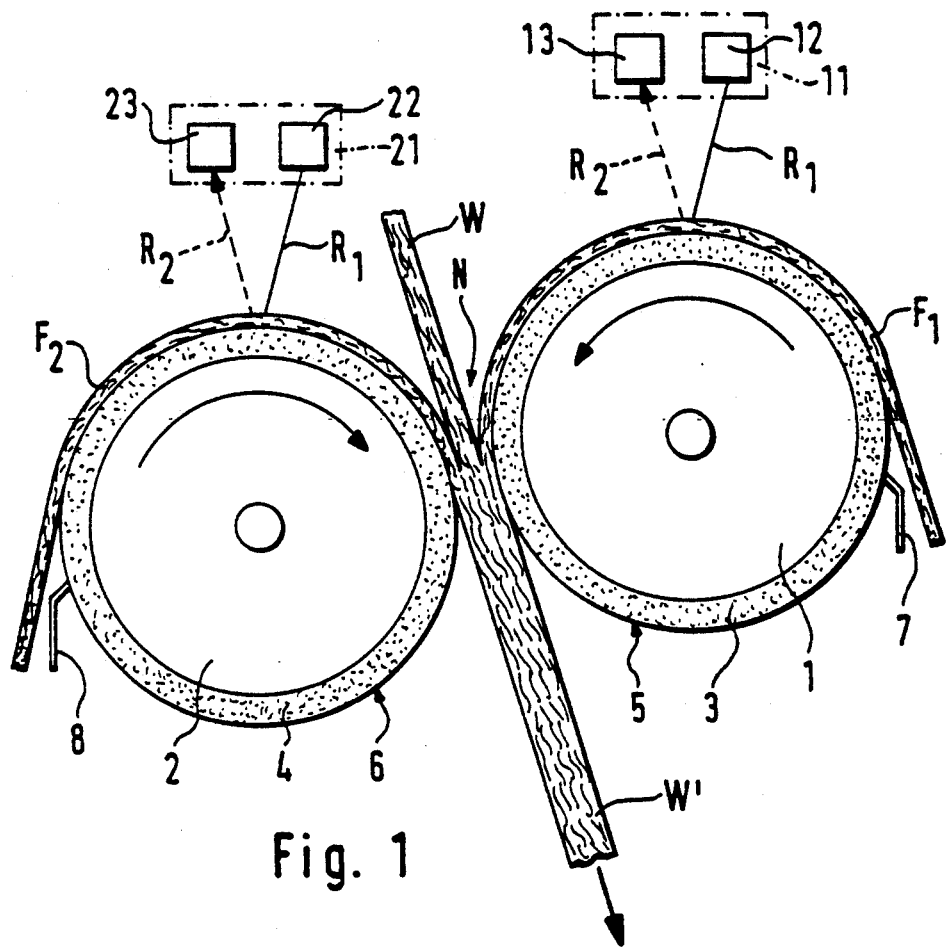
FIG. 1 is a schematic view of a size press and of the principle of measurement of the coating quantities by means of the size press.

Referring more particularly to the drawings, in FIG. 1, the size press rolls are designated with reference numerals 1 and 2. The rolls 1 and 2 form a size press nip N with each other, through which nip the paper web W is passed. In normal manner, the rolls 1, 2 are provided with roll coatings 3, 4. In FIG. 1, reference numerals 7 and 8 schematically denote parts of the coating device by means of which the size films $F_1$ and $F_2$ are transferred onto the faces of the paper web W, and the coated web is indicated as W' in FIG. 1.

According to the present invention, the measurement of the quantity of size is based on X-ray fluorescence. At the proximity of the faces 5, 6 of the rolls 1, 2, measurements heads 11, 21 are provided which contain sources of radiation 12, 22. The sources of radiation of 12, 22 are preferably $Fe^{55}$ radiation sources, which emit X-ray radiation, i.e. primary radiation $R_1$, to the faces 5, 6 of rolls 1, 2. The measurements heads 11, 21, further include proportional calculator 13, 23, which measure the radiation emitted from the roll faces 5, 6 or from the size films $F_1$, $F_2$, i.e. the secondary radiation $R_2$. Instead of using $Fe^{55}$ as radiation source, it is also possible to use another sufficiently efficient source of radiation, such as X-ray tubes. The proportional calculator 13, 23 may also be substituted for by some other device that detects the intensity and/or the spectrum of the radiation.

The measurement based on the method of the invention can be carried out in two alternative manners. According to a first embodiment, the coating 3, 4 on the size press roll 1, 2 contains titanium. In other respects, the roll coating 3, 4 may be conventional polyurethane coating to which e.g. about 5% titanium dioxide has been mixed. The roll coating 3, 4 that contains titanium dioxide is subjected to X-ray radiation by means of the radiation source 12, 22 of the measurement head 11, 21, the primary radiation $R_1$ emitted from said source of radiation penetrating through the size film $F_1$, $F_2$ into the roll coating 3, 4. The primary radiation $R_1$ fluoresces the titanium present in the roll coating, the titanium emitting the fluoresced radiation as a secondary radiation $R_2$ back to the proportional calculator 13, 23 in the measurement head 11, 21.

Figure 2:
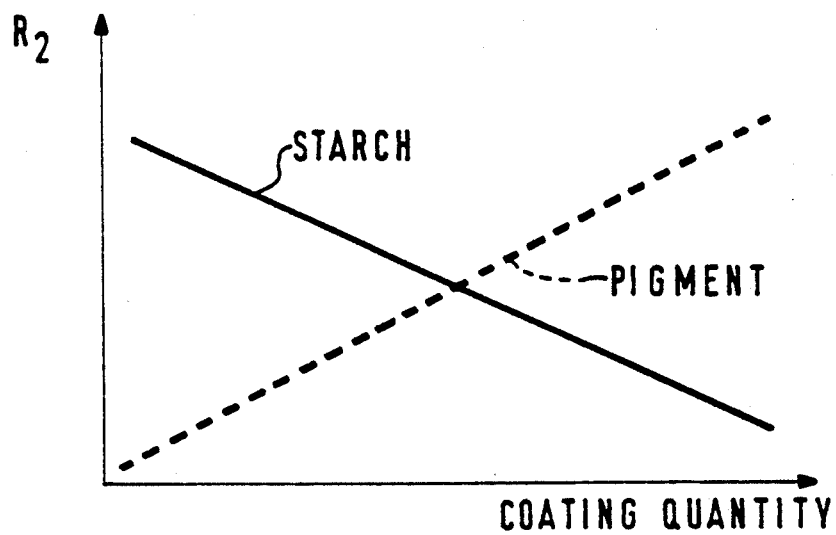
FIG. 2 is a schematic graphic representation illustrating the relationship between the coating quantity and the secondary radiation occurring during measurement with coatings of different types.

The size film $F_1$ $F_2$ (starch film), absorbs part of the fluoresced radiation, so that only the secondary radiation $R_2$ that passed through the film $F_1$ $F_2$ is measured by the proportional calculator 12, 13, or by a corresponding device that detects the intensity and/or the spectrum of the radiation. The attentuation of radiation caused by the size film $F_1$ $F_2$ is proportional to the thickness of the size film $F_1$ $F_2$ as shown by the full line in the graphic representation in FIG. 2.

When the coefficient of absorption in the coating agent (size) is known in advance, the readings of the proportional calculator 13, 23 can be converted into units of $g/m^2$, To determine the thickness of the size film $F_1$ $F_2$, it is of course necessary to first measure the intensity of the fluoresced radiation from the roll 1, 2 face 5, 6 when there is no size film on the roll face. Based thereon, the thickness of the size film $F_1$ $F_2$ is determined by means of an equation, which is based on the difference between two factors, intensity of radiation when there is no size film $F_1$ $F_2$ on the roll face 5, 6 and the intensity of radiation when there is a size film $F_1$ $F_2$ on the roll face 5, 6. In this method of measurement the size (starch) must be free of titanium.

Furthermore, it is clear that in the roll coating 3, 4, it is also possible to use some other fluorescent marker agent, although titanium has been found to be the best in practice. According to test runs carried out by means of a test machine, a roll coating 3, 4 that contains 5% of titanium dioxide does not increase the wear of the coating rod or blade and, moreover, the surface life of the roll coating 3, 4 remains at least equal to that with no titanium dioxide. In fact, it is has even been noticed that titanium dioxide even increased the durability of the roll coating 3, 4. When the invention is carried out in the manner described above by using a roll coating 3, 4 that contains titanium dioxide, the coating agent itself (starch) must be free of titanium in order that a reliable measurement result can be obtained.

The measurement method of the invention can also be carried out without a roll coating that contains titanium dioxide. According to this embodiment, a suitable fluorescent marker agent, such as calcium or titanium, must be added to the coating agent (pigment). Titanium dioxide and, for example, calcium carbonate are common additives which are used, e.g. to improve the whiteness and the opacity of paper. In such case, the fluorescent radiation produced by the fluorescent marker present in the coating agent is measured directly. The thickness of the film of coating material is obtained of a value of $g/m^2$ when the composition of the coating agent and the intensity of the fluorescent radiation are known, the radiation being measured by means of the proportional calculator 13, 23, or its equivalent, in the measurement head 11, 21. In such case, the thickness of the film is proportional to the measured intensity of the secondary radiation $R_2$, as illustrated by the dashed line in FIG. 2. In such case, when the coating agent itself contains the fluorescent marker agent, the roll coating 3, 4 must not contain titanium or any other corresponding marker agent. When a calcium-containing coating agent has been used, a calcium concentration of about 8% has provided good measurement results.

Figure 3:
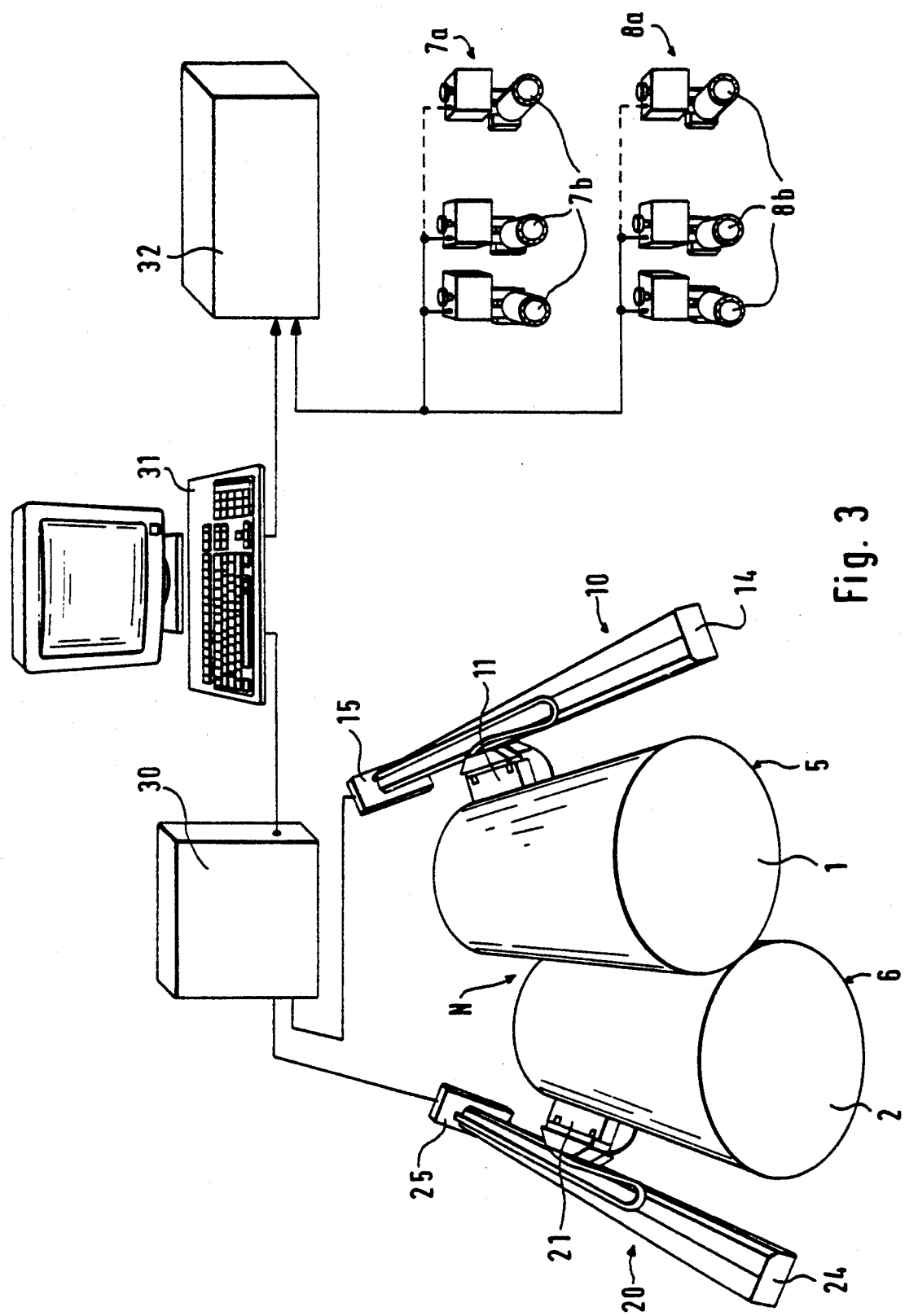
FIG. 3 is a schematic illustration of a measurement equipment in accordance with the present invention.

FIG. 3 is a schematic illustration of an equipment operating in accordance with the method of the invention. The equipment includes measurement devices fitted in connection with each of the rolls 1, 2 in the size press, the devices in FIG. 3 being generally denoted with the reference numerals 10 and 20. Each measurement device 10, 20, comprises a measurement beam 14, 24 in the transverse direction of the machine, the measurement head (one sided scanner) being fitted to move back and forth across the axial width of the roll 1, 2 along guides mounted on the measuring beam.

As already described with respect to FIG. 1, the measurement head 11, 21 contains the source 12, 22 of radiation ($Fe^{55}$ radiation source) and a proportional calculator 13, 23 or its equivalent. One end of the measurement beam 14, 24 is provided with a drive gear 15, 25, which includes an electric motor for displacing the measurement head 11, 21 along the measurement beam 14, 24, as well as a position detector, (potentiometer), which indicates the position of the measurement head 11, 21 in the axial width direction of the roll 1, 2. The measurements heads 11, 21 are installed in direct proximity to the rolls 1, 2 so that the distance thereof from the roll face 5, 6 is, e.g. about 30 mm.

Since the measurement heads 11, 21 are placed at locations which are quite susceptible to contamination, deposition of impurities on the measurement head is prevented, among other ways, by means of an air brush mounted below the measurement window as well as by means of the mechanical construction of the measurements heads 11, 21. The coarse measurement signals arriving from the measurement head 11, 21 are transmitted to the regulation unit 30 of the measurement device, where the voltage sources, as well as the control cards necessary for the control of the measurement heads 11, 21 are placed. The regulation unit 30 of the measurement device is of the microprocessor type and is capable of fully independently controlling the measurement heads 11, 21 on the measurement beam 14, 24. The regulation unit 30 of the measurement device converts the signals arriving from the measurement heads 11, 21 to film thickness values and, at the same time regulates the measurement heads 11, 21.

A work station 31, (microcomputer) is connected to the regulation unit 30 as an operator interface, the film thickness values being transferred from the regulation unit 30 to the work station 31. Further in FIG. 3, the coating heads of the coating devices for each of the rolls 1, 2 in the size press are denoted with reference numerals 7a and 8a and the micrometer equalizers intended for the regulation of the profile of the coating blade are denoted with reference numerals 7b and 8b. In FIG. 3, the coating head regulation unit used for controlling the micrometer equalizers 7b and 8b of the coating heads is denoted by reference numeral 32.

The measurement profiles to be run by means of the measurement devices 10, 20 are divided into zones in accordance with the number of the micrometer equalizers 7b, 8b so that there is one zone for each micrometer equalizer. The time to be used for the measurement of each zone depends on the composition of the coating agent or on the titanium content in the roll face 5, 6. Initially a "map" of the roll face 1, 2 is introduced into the memory of the regulation unit 30 of the measurement device, whereby inhomogeneity of the roll and defects of position of the measurement beam 14, 24 can be compensated for in the measurement. This premeasurement (so called bare-roll-scan), must always be carried out when the measurement beam 14, 24 or the roll 1, 2 is detached or displaced. In practice, premeasurement must always be carried out in connection with replacement of rolls. Calibration (or standardization) of the measurement device 10, 20 is carried out to compensate for drifting taking place in the radiation source 12, 22. It is automatically carried out sufficiently frequently (for example, one time per hour) in order that changes taking place in the radiation source 12, 22 can be taken into account.

As previously stated, the film thickness values are transferred from the regulation unit 30 of the measurement device to the work station 31, which shows the measurement profiles on a monitor. As shown in FIG. 3, there is a direct connection from the work station to the coating head regulation unit 32. In the work station 31, the necessary regulation alogorithms may be programmed, for example, for the preloading positions of the coating members of the coating devices and for the pressure in the loading hose in the coating member, as well as for the positions of the micrometer equalizers 7b 8b. Thus, based on the measurement data received from the measurement devices 10, 20, the work station 31 can immediately give the necessary control signals for the necessary adjustments to be carried out. The work station 31 may also be used as a manually controlled remote-control station for adjusting the micrometer equalizers 7b 8b. In such case, the operator of the machine can alter the positions of the micrometer equalizers 7b, 8b by means of the work station 31 in accordance with the coating-agent profile shown in the monitor.

If a blade coater is used for pigmenting or for sizing, a good regulation of the profile is obtained by means of the micrometer equalizers 7b, 8b and these micrometer equalizers can also be used for regulating the overall quantity of pigment, even though this regulation of overall quantity is primarily carried out by means of a pre-loading of the coating member and by means of a loading hose.

If a rod, preferably a grooved rod, is used as the coating member, only slight changes can be made in the size profile and the overall quantity of size by means of micrometer equalizers. In this connection, mainly profile defects which are caused by defects on the rod or in the roll face are compensated for. If both the coating rod and the roll face are in good condition, hardly any adjustments are needed, in which case, the system operates primarily as a monitoring system.

DESCRIPTION OF PREFERRED EMBODIMENTS

The following examples are given with respect to applications in which the method and equipment in accordance with the invention can be used. It is to be understood that variations and modifications can be made and the scope of the invention is not meant to be limited to these examples.

If the roll face contains titanium, starch or pigment of almost any type whatsoever, the same can be measured, with the exception of the use of titanium pigment, in connection with which the roll face must not contain pigment. The accuracy of the measurement speed depends on the composition of the pigment and on the titanium content of the roll face. Such system can be applied in the following cases:

Sizing with starch
(dry solids content 8%)
The thickness of the film is measured indirectly from the absorption of the fluorescent X-ray radiation derived from the Ti-atoms present in the roll face. The roll face must contain titanium Pigmenting with clay
(dry solids content about 45%)
As above.

Pigmenting with $CaCO_3$
(dry solids content about 45%)
The thickness of the film is measured indirectly from the fluorescent X-ray radiation produced by the Ca-atoms present in the pigment. The roll face does not necessarily have to contain titanium.

Pigmenting with $TiO_2$
(dry solids content about 45%)
The thickness of the film is measured directly from the fluorescent X-ray radiation produced by the Ti-atoms present in the pigment. The roll face does not necessarily have to contain titanium.

The reproducibility of the measurements must be determined from case to case. The operability of the measurement system can be illustrated by means of the following results obtained during test runs.

| Sizing with starch (dry solids content 8%) | |
|---|---|
| film | 20 g/m² |
| measurement time | 5 s |

| -continued | |
| --- | --- |
| reproducibility | 1.0 g/m² (1-sigma) |
| roll face | 5% TiO₂ |
| Pigmenting with CaCO₃ | |
| (dry solids content 45%) | |
| film | 15 g/m² |
| measurement time | 5 s |
| reproducibility | 0.25 g/m₂ (1-sigma) |

In both cases a 100 mCi/Fe$^{55}$ radiation source was used. Reproducibility can be improved, for example, by using a stronger source of radiation.

Since, in the method of the invention, the measurement of coating quality is carried out as a measurement of wet film directly from the size press roll face 5, 6 before the coating agent is transferred onto the paper web W, it can be considered that the method involves a slight error, because the whole of the size film $F_1$ $F_2$ does not adhere to the web W, but part of the film remains on the roll face 5, 6. It has been measured in a production machine that the proportion of coating agent that remains on the roll face is on an order of 2 g/m² when the thickness of the size film is on an order of 20. . . 30 g/m². Said measurement was carried out manually. Such possible error can be avoided completely by the quantity of coating agent being measured from the size press roll face 56 both before and after the coating nip N. Such mode of measurement provides an absolutely accurate result.

Although the invention has been described by way of example with reference to the embodiments illustrated in the figures in the accompanying drawing, the invention is not meant to be limited to the specific embodiments shown in the drawings. It is to be understood that variations of the embodiments of the invention can be made without departing from the spirit or scope of the invention.

What is claimed is:

1. Method of measuring and regulating the quantity of coating in sizing or pigmenting of paper or board, which comprises
   spreading a coating agent in the form of a film onto a face of a roll in a size press, said roll face comprising a roll coating,
   transferring the film of coating agent from the face of the roll onto a board or web in a nip of the size press,
   mixing a fluorescent marker agent into the roll coating,
   irradiating the roll face with X-ray radiation before the film of coating agent is transferred onto the board or web, to fluoresce the marker agent, the fluoresced radiation emitted by the marker agent contained in the roll coating being attenuated by the coating agent,
   measuring the fluoresced radiation emitted by the marker agent and converting the measurement into a value of thickness of coating quantity, and
   regulating variations in thickness of coating quantity.

2. Method according to claim 1 wherein the fluorescent marker agent is added to the coating agent.

3. Method according to claim 1 wherein titanium or a titanium-containing compound is used as the fluorescent marker agent.

4. Method according to claim 2 wherein the fluorescent marker agent is titanium or a titanium compound added to the roll coating in an amount such that the titanium content in the coating is between about 3-10% by weight.

5. Method according to claim 3 wherein the titanium compound is about 5% by weight.

6. Method according to claim 2 wherein the fluorescent marker agent is calcium or a calcium-containing compound.

7. Method according to claim 2 wherein the amount of marker agent added to the coating agent is about 5-12% by weight.

8. Method according to claim 7 wherein the amount of marker agent is about 8%.

9. Method according to claim 1 wherein the measurement of fluoresced radiation is carried out across the axial width of the roll to determine the profile of coating quantity.

10. Method according to claim 1 wherein the source of radiation is a Fe$^{55}$ radiation source and the fluoresced radiation is measured to detect the intensity or spectrum of the fluoresced radiation.

11. Method according to claim 10 wherein the measurement of the fluoresced radiation is effected at the proximity of the roll face across the axial width of the roll face.

12. Method according to claim 1 wherein the measurement of the value of thickness of coating quantity is passed to a regulation unit to regulate the quantity of coating agent and correct any variations therein.

13. Arrangement for measuring and regulating quantity of coating in surface sizing or pigmenting of paper or board, comprising
   a roll in a size press of a size press nip, said roll having a roll coating including a fluorescent marker agent mixed therein,
   coating means for spreading a coating agent in the form of a film onto a face of said roll,
   film transferring means for transferring the film from said roll face onto a paper or board and for passing the paper or board with the film thereon through said press nip, and
   measuring means arranged in proximity with said roll face before said size press nip, said measuring means comprising
   a source of X-ray radiation emission structured and arranged to irradiate said roll face with X-ray radiation before the film of coating agent is transferred onto the board or web, the fluoresced radiation emitted by the marker agent contained in the roll coating being attenuated by the coating agent,
   radiation measuring means for measuring radiation intensity or spectrum of radiation signals emitted from said roll face or said film, and
   conversion means for converting the measured radiation signals to values corresponding to quantity and thickness of said film on said roll face,
   and regulation means receiving the measured values from said conversion means and regulating the quantity of coating agent and correcting any variations therein based on said measured values.

14. Arrangement according to claim 13 wherein said source of X-ray radiation is arranged to traverse across the axial width of said roll.

15. Arrangement according to claim 13, further comprising a measurement beam arranged transverse to a machine direction and across an axial width of said roll, a measurement device fitted at the proximity of said roll face before said size press nip, said measurement device comprising a measurement head installed on said measurement beam, said measurement head including said source of X-ray radiation, a proportional calculator comprising said radiation measuring means, and a programmable regulation unit comprising said radiation measuring means, said measurement head being movable along said measurement beam across the axial width of said roll.

16. Arrangement according to claim 14 wherein said source of radiation is a $Fe^{55}$ radiation source.

* * * * *